United States Patent
Akahira et al.

(10) Patent No.: US 9,920,180 B2
(45) Date of Patent: Mar. 20, 2018

(54) POLYESTER RESIN COMPOSITION AND METHOD FOR PRODUCING SAME

(71) Applicant: TORAY INDUSTRIES, INC., Tokyo (JP)

(72) Inventors: Masato Akahira, Nagoya (JP); Koya Kato, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/128,041

(22) PCT Filed: Mar. 26, 2015

(86) PCT No.: PCT/JP2015/001746
§ 371 (c)(1),
(2) Date: Sep. 21, 2016

(87) PCT Pub. No.: WO2015/146183
PCT Pub. Date: Oct. 1, 2015

(65) Prior Publication Data
US 2017/0096541 A1 Apr. 6, 2017

(30) Foreign Application Priority Data
Mar. 28, 2014 (JP) ................................ 2014-069248

(51) Int. Cl.
*C08K 3/16* (2006.01)
*C08K 5/098* (2006.01)

(52) U.S. Cl.
CPC ............. *C08K 3/16* (2013.01); *C08K 5/098* (2013.01); *C08K 2201/014* (2013.01)

(58) Field of Classification Search
CPC ........................................ C08K 3/16
USPC ........................................ 528/277
See application file for complete search history.

(56) References Cited

U.S. PATENT DOCUMENTS

2010/0292375 A1    11/2010    Kliesch et al.

FOREIGN PATENT DOCUMENTS

| JP | 54-94550 A | 7/1979 |
| JP | 62-177057 A | 8/1987 |
| JP | 1-172448 A | 7/1989 |
| JP | 5-230201 A | 9/1993 |
| JP | 2010-202837 A | 9/2010 |
| JP | 2010-265459 A | 11/2010 |

OTHER PUBLICATIONS

International Search Report for PCT/JP2015/001746 (PCT/ISA/210) dated Apr. 21, 2015.
Written Opinion of the International Searching Authority for PCT/JP2015/001746 (PCT/ISA/237) dated Apr. 21, 2015.

*Primary Examiner* — Terressa Boykin
(74) *Attorney, Agent, or Firm* — Birch, Stewart, Kolasch & Birch, LLP

(57) ABSTRACT

An object is to provide a polyester resin having excellent hydrolysis resistance and good color tone and a method of producing the same. There is provided a polyester resin composition comprising a polyester resin that is prepared from a dicarboxylic acid or a dicarboxylic acid dialkyl ester and a diol as main raw material and mixed with: a copper halide; and at least one additive selected from the group consisting of compounds expressed by a formula (i) and compounds expressed by a formula (ii): $MX_n$ ... (i) (where M denotes an alkali metal or an alkaline earth metal, X denotes at least one element selected from bromine, iodine and chlorine, and n=1 or 2); and $(RCOO)_nM$ ... (ii) (where R denotes hydrogen or an alkyl group containing 1 to 30 carbon atoms, M denotes an alkali metal or an alkaline earth metal, and n=1 or 2).

16 Claims, No Drawings

POLYESTER RESIN COMPOSITION AND METHOD FOR PRODUCING SAME

TECHNICAL FIELD

The present application claims priority from Japanese Patent Application No. 2014-069248 filed on Mar. 28, 2014, the entirety of disclosure of which is hereby incorporated by reference into this application.

The present invention relates to a polyester resin composition and a method of producing the same.

RELATED ART

Polyester has excellent mechanical strength, chemical stability and transparency and is inexpensive. Accordingly polyester is one of the most commonly used synthetic resins in the world for fibers, bottles, films, sheets, containers and the like.

The polyester, however, has a problem that the terminal acidic carboxyl group serves as a catalyst to accelerate hydrolysis of the ester bonding. For example, addition of a copper compound having the effect of reducing the acid value may be employed to improve the hydrolysis resistance of the polyester.

Patent Literature 1 discloses a polyester film containing copper (I) iodide and describes that containing copper (I) iodide improves the thermal stability. Patent Literature 2 discloses a polyester film containing a copper compound and describes that containing the copper compound reduces the acid value and improves the hydrolysis resistance. Additionally, Patent Literature 3 discloses a biaxially oriented polyester film containing at least one of an organic copper salt such as copper (II) acetate and a halide and describes that the combined use of the organic copper salt such as copper (II) acetate and an iodide is effective for decarboxylation.

CITATION LIST

Patent Literature

Patent Literature 1: JP S62-177057A;
Patent Literature 2: JP 2010-202837A
Patent Literature 3: JP 2010-265459A

SUMMARY

Technical Problem

In Patent Literature 1, simply adding copper (I) iodide in production of the polyester resin as the raw material of the polyester film provides the poor dispersibility and fails to sufficiently improve the thermal stability.

The technique described in Patent Literature 2 has insufficient effect of reducing the acid value and insufficient hydrolysis resistance. Further improvement is accordingly demanded.

Additionally, in Patent Literature 3, containing an organic copper salt such as copper (II) acetate causes a problem of coloring in the polyester film.

An object of the invention is to provide a polyester resin composition having excellent hydrolysis resistance and good color tone and a method of producing the same.

Solution to Problem

As the result of intensive study in order to solve the above problems, the inventors have accomplished the invention based on the finding of a polyester resin composition having excellent hydrolysis resistance and good color tone and a method of producing the same.

The invention may be implemented by the following aspects.

(1) A polyester resin composition, comprising:
a polyester resin that is prepared from a dicarboxylic acid or a dicarboxylic acid dialkyl ester and a diol as main raw material and mixed with
a copper halide; and
at least one additive selected from the group consisting of compounds expressed by a formula (i) and compounds expressed by a formula (ii):

$$MX_n \quad (i)$$

(where M denotes an alkali metal or an alkaline earth metal, X denotes at least one element selected from bromine, iodine and chlorine, and n=1 or 2); and $$(RCOO)_nM \quad (ii)$$

(where R denotes hydrogen or an alkyl group containing 1 to 30 carbon atoms, M denotes an alkali metal or an alkaline earth metal, and n=1 or 2).

(2) The polyester resin composition according to (1),
wherein 0.01 to 1 mmol of the copper halide is mixed relative to 100 g of the polyester resin.

(3) The polyester resin composition according to either (1) or (2),
wherein 0.01 to 3 mmol of the at least one additive selected from the group consisting of the compounds expressed by the formula (i) and the compounds expressed by the formula (ii) is mixed relative to 100 g of the polyester resin.

(4) The polyester resin composition according to any one of (1) to (3),
wherein a ratio (P/Q) of a mixing amount (P mol) of the at least one additive selected from the group consisting of the compounds expressed by the formula (i) and the compounds expressed by the formula (ii) to a mixing amount (Q mol) of the copper halide is 0.1 to 50.

(5) The polyester resin composition according to any one of (1) to (4),
wherein copper of the copper halide is either monovalent or divalent.

(6) The polyester resin composition according to any one of (1) to (5),
wherein a halogen atom of the copper halide includes at least one element selected from the group consisting of iodine, bromine and chlorine.

(7) The polyester resin composition according to any one of (1) to (6),
wherein X of the compound expressed by the formula (i) is either iodine or bromine.

(8) The polyester resin composition according to any one of (1) to (7),
wherein M of the compound expressed by the formula (i) is potassium.

(9) The polyester resin composition according to any one of (1) to (8),
wherein R of the compound expressed by the formula (ii) is hydrogen or a linear saturated alkyl group containing 1 to 30 carbon atoms.

(10) The polyester resin composition according to (9),
wherein R of the compound expressed by the formula (ii) is a linear saturated alkyl group containing 1 to 17 carbon atoms.

(11) The polyester resin composition according to (10), wherein the compound expressed by the formula (ii) is either potassium acetate or potassium stearate.

(12) The polyester resin composition according to any one of (1) to (11), wherein the dicarboxylic acid or the dicarboxylic acid dialkyl ester is an aromatic dicarboxylic acid or a aromatic dicarboxylic acid dialkyl ester.

(13) The polyester resin composition according to any one of (1) to (12), wherein the diol is ethylene glycol.

(14) The polyester resin composition according to any one of (1) to (13), wherein the polyester resin has an intrinsic viscosity of 0.50 to 1.8.

(15) The polyester resin composition according to any one of (1) to (14), wherein the polyester resin has an acid value of not higher than 13 eq/t.

(16) The polyester resin composition according to any one of (1) to (15), wherein the polyester resin has an amount of terminal benzoic acid group of 3 to 30 eq/t.

(17) The polyester resin composition according to any one of (1) to (16), the polyester resin composition having a solution haze of not higher than 3%.

(18) A method of producing a polyester resin composition, comprising:
adding a copper halide and at least one additive selected from the group consisting of compounds expressed by a formula (i) and compounds expressed by a formula (ii) to a polyester resin prepared from a dicarboxylic acid or a dicarboxylic acid dialkyl ester and a diol as main raw material:

$$MX_n \qquad (i)$$

(where M denotes an alkali metal or an alkaline earth metal, X denotes at least one element selected from bromine, iodine and chlorine, and n=1 or 2); and $$(RCOO)_nM \qquad (ii)$$

(where R denotes hydrogen or an alkyl group containing 1 to 30 carbon atoms, M denotes an alkali metal or an alkaline earth metal, and n=1 or 2).

(19) The method of producing the polyester resin composition according to (18), wherein the adding comprises adding the copper halide and the additive to the polyester resin at start of polycondensation or during polycondensation.

Advantageous Effects of Invention

The invention provides a polyester resin composition having excellent hydrolysis resistance and excellent color tone.

DESCRIPTION OF EMBODIMENTS

According to an embodiment of the invention, there is provided a polyester resin composition in which a polyester resin obtained by polycondensation of a dicarboxylic acid or a dicarboxylic acid dialkyl ester and a diol as main raw material is mixed with a copper halide and at least one additive selected from the group consisting of compounds of a formula (i) and compounds of a formula (ii) given below:

$$MX_n \qquad (i)$$

(where M denotes an alkali metal or an alkaline earth metal, X denotes at least one element selected from bromine, iodine and chlorine, and n=1 or 2); and $$(RCOO)_nM \qquad (ii)$$

(where R denotes hydrogen or an alkyl group containing 1 to 30 carbon atoms, M denotes an alkali metal or an alkaline earth metal, and n=1 or 2).

The copper halides are known to have the effect of reducing the acid value of the polyester resin and the effect of improving hydrolysis resistance of the polyester resin. There is, however, a problem that the copper halide alone has little effect of reducing the acid value and insufficient effect of improving the hydrolysis resistance. This may be attributed to the low dispersibility of the copper halide. Addition of at least one additive selected from the group consisting of the compounds expressed by the formula (i) and the compounds expressed by the formula (ii) to the copper halide is expected to be effective for improving the dispersibility of the copper halide.

(1) Polyester Resin

The polyester resin used according to the embodiment of the invention is obtained by polycondensation of a dicarboxylic acid or a dicarboxylic acid dialkyl ester and a diol as main raw material. The main raw material herein means that the structural unit of the dicarboxylic acid or the dicarboxylic acid dialkyl ester and the diol in the polymer is equal to or higher than 25% by weight. The structural unit of the dicarboxylic acid or the dicarboxylic acid dialkyl ester and the diol in the polymer is preferably equal to or higher than 40% by weight, is more preferably equal to or higher than 50% by weight, is furthermore preferably equal to or higher than 95% by weight and is most preferably equal to 100% by weight.

The dicarboxylic acid or the dicarboxylic acid dialkyl ester may include, for example, aromatic dicarboxylic acids such as terephthalic acid, isophthalic acid, 2,6-naphthalene dicarboxylic acid, diphenyl-4,4'-dicarboxylic acid, diphenyl ether-4,4'-dicarboxylic acid, diphenyl thioether-4,4'-dicrboxylic acid, 5-tetrabutylphosphoniumisophthalic acid and 5-sodiumsulfoisophthalic acid; aliphatic dicarboxylic acids such as oxalic acid, malonic acid, succinic acid, glutaric acid, adipic acid, pimelic acid, suberic acid, sebacic acid, azelaic acid, undecanedioic acid, dodecanedioic acid and malonic acid; and dialkyl esters thereof.

The dicarboxylic acid dialkyl ester herein includes lower alkyl esters, acid anhydrides and acyl chlorides of the dicarboxylic acids described above, and methyl esters, ethyl esters and hydroxyethyl esters may be used preferably.

In terms of providing a polyester resin having excellent heat resistance, the dicarboxylic acid or the dicarboxylic acid dialkyl ester used according to the embodiment of the invention is preferably an aromatic dicarboxylic acid or an aromatic dicarboxylic acid dialkyl ester and is more preferably terephthalic acid or dimethyl terephthalate.

The diol used according to the embodiment of the invention may be, for example, ethylene glycol, 1,3-propanediol, neopentyl glycol, 1,5-pentanediol, 1,6-hexanediol, decamethylene glycol, 2,2,4,4-tetramethyl-1,3-cyclobutanediol, cyclohexanedimethanol, xylylene glycol, polyethylene glycol, polypropylene glycol, polytetramethylene glycol, bisphenol A-ethylene oxide adduct, 4,4'-dihydroxybiphenyl, hydroquinone, resorcinol, 4,4'-dihydroxydiphenyl ketone, 4,4'-dihydroxydiphenyl ether, bis(4-hydroxyphenyl)methane, 1,2-bis(4-hydroxyphenyl)ethane, 4,4'-dihydroxydiphenyl sulfone, 4,4'-dihydroxydiphenyl thioether, 2,6-dihydroxynaphthalene and 1,5-dihydroxynaphthalene. Among them ethylene glycol is used preferably as the diol, in terms of providing a polyester resin having excellent heat resistance.

Another component that is copolymerizable at a ratio of lower than 75% by weight as the structural unit of the polyester resin used according to the embodiment of the invention may be, for example, para-hydroxybenzoic acid, meta-hydroxybenzoic acid, 2-hydroxy-6-naphthoic acid, 2-hydroxy-3-naphthoic acid, 1-hydroxy-5-naphthoic acid, 4-hydroxy-4'-carboxydiphenyl ether and 4-aminophenol.

The polyester resin used according to the embodiment of the invention may be any polyester resin obtained by polycondensation of the dicarboxylic acid or the dicarboxylic acid dialkyl ester and the diol as main raw material. The dicarboxylic acid or the dicarboxylic acid dialkyl ester and the diol used may be a single dicarboxylic acid or a single dicarboxylic acid dialkyl ester and a single diol or may be a combination of two or more dicarboxylic acids or dicarboxylic acid dialkyl esters and a combination of two or more diols. The polyester resin used according to the embodiment of the invention may be, for example, polyethylene terephthalate, polypropylene terephthalate, polycyclohexane dimethylene terephthalate, polyethylene isophthalate, polypropylene isophthalate, polybutylene isophthalate, polycyclohexane dimethylene isophthalate, polyethylene naphthalate, polypropylene naphthalate, polybutylene naphthalate, polyethylene isophthalate/terephthalate, polypropylene isophthalate/terephthalate, polyethylene terephthalate/naphthalate, polypropylene terephthalate/naphthalate, polyethylene terephthalate/5-sodium sulfoisophthalate, polypropylene terephthalate/5-sodium sulfoisophthalate, polyethylene terephthalate/polyethylene glycol, polypropylene terephthalate/polyethylene glycol, polyethylene terephthalate/polytetramethylene glycol, polypropylene terephthalate/polytetramethylene glycol, polyethylene terephthalate/isophthalate/polytetramethylene glycol, polypropylene terephthalate/isophthalate/polytetramethylene glycol, polyethylene terephthalate/succinate, polypropylene terephthalate/succinate, polyethylene terephthalate/adipate, polypropylene terephthalate/adipate, polyethylene terephthalate/sebacate or polypropylene terephthalate/sebacate. The sign "/" herein represents copolymer. The polyester resin used may be any polyester resin that is formed from a structural unit selected from the group consisting of, for example, an aromatic oxycarbonyl unit, an aromatic dioxy unit, an aromatic dicarbonyl unit, an aromatic aminooxy unit and an ethylene oxide unit and has thermotropic liquid crystallinity. Especially preferable is a polyester resin obtained from terephthalic acid or dimethyl terephthalate, because of its excellent heat resistance.

With regard to the polyester resin used according to the embodiment of the invention, the intrinsic viscosity measured at 25° C. using an o-chlorophenol solvent is preferably not lower than 0.50, is more preferably not lower than 0.55 and is furthermore preferably not lower than 0.6. The intrinsic viscosity is, on the other hand, preferably not higher than 1.8, is more preferably not higher than 1.5 and is furthermore preferably not higher than 1.4. The intrinsic viscosity of not lower than 0.50 tends to improve the mechanical strength. The intrinsic viscosity of not higher than 1.8, on the other hand, tends to facilitate melt processing.

When the total amount of components other than the polyester resin, for example, a polycondensation catalyst, a copper halide and an additive, is less than 1% by weight, the intrinsic viscosity measured by dissolving the polyester resin composition in the o-chlorophenol solvent is defined as the intrinsic viscosity of the polyester resin. When the polyester resin composition includes not lower than 1% by weight of, for example, the polycondensation catalyst, the copper halide and the additive as the total amount, the intrinsic viscosity is measured after removal of the additive and the like to decrease the total amount to be less than 1% by weight.

The polyester resin according to the embodiment of the invention preferably has the acid value of not higher than 13 eq/t. The acid value of the polyester resin is more preferably not higher than 10 eq/t, is furthermore preferably not higher than 5 eq/t and is most preferably not higher than 2 eq/t. The acid value of not higher than 13 eq/t improves the hydrolysis resistance. The acid value of the polyester resin may be measured by titration. Similarly to the above, when the total amount of the components other than the polyester resin, for example, the polycondensation catalyst, the copper halide and the additive, is less than 1% by weight, the acid value measured by titration of a solution of the polyester resin composition dissolved in an ortho-cresol solvent at 25° C. using a 0.02 N NaOH aqueous solution is defined as the acid value of the polyester resin. When the polyester resin composition includes not lower than 1% by weight of, for example, the polycondensation catalyst, the copper halide and the additive as the total amount, the acid value is measured after removal of the additive and the like to decrease the total amount to be less than 1% by weight.

The polyester resin according to the embodiment of the invention has the terminal benzoic acid group formed by decarboxylation as part of the polymer chain terminal and thereby provides the effect of reducing the acid value. The amount of terminal benzoic acid group is preferably not lower than 3 eq/t. The amount of terminal benzoic acid group is more preferably not lower than 10 eq/t, is furthermore preferably not lower than 15 eq/t and is most preferably not lower than 19 eq/t. The amount of terminal benzoic acid group of not lower than 3 eq/t improves the hydrolysis resistance. The amount of terminal benzoic acid group is, on the other hand, preferably not higher than 30 eq/t. The amount of terminal benzoic acid group is more preferably not higher than 25 eq/t. The amount of terminal benzoic acid group of not higher than 30 eq/t facilitates high polymerization of the polymer. The amount of terminal benzoic acid group may be measured by NMR. Similarly to the above acid value, when the total amount of the components other than the polyester resin, for example, the polycondensation catalyst, the copper halide and the additive, is less than 1% by weight, the amount of terminal benzoic acid group measured by NMR measurement of the polyester resin composition is defined as the amount of terminal benzoic acid group of the polyester resin. When the polyester resin composition includes not lower than 1% by weight of, for example, the polycondensation catalyst, the copper halide and the additive as the total amount, the amount of terminal benzoic acid group is measured after removal of the additive and the like to decrease the total amount to be less than 1% by weight.

(2) Copper Halide

The copper halide according to the embodiment of the invention may be, for example, copper (I) iodide, copper (II) iodide, copper (I) bromide, copper (II) bromide, copper (I) chloride or copper (II) chloride. In terms of providing a polyester resin having the significant effect of improving the hydrolysis resistance and the less coloring, copper (I) iodide, copper (II) iodide, copper (I) bromide and copper (II) bromide are preferable as the copper halide, and especially preferable are copper (I) iodide and copper (I) bromide. The valence of copper of the copper halide is preferably monovalence or divalence. The halogen atom of the copper halide preferably includes at least one element selected from the group consisting of iodine, bromine and chlorine.

According to the embodiment of the invention, in order to improve the dispersibility of the copper halide and efficiently reduce the acid value, the mixing amount of the copper halide is preferably not less than 0.01 mmol and is more preferably not less than 0.02 mmol per 100 g of the polyester resin. The mixing amount of the copper halide is, on the other hand, preferably not greater than 1 mmol, is more preferably not greater than 0.5 mmol and is furthermore preferably not greater than 0.15 mmol per 100 g of the polyester resin. When the copper halide is added in the course of polycondensation of the polyester resin, the mixing amount of the copper halide may be calculated based on the theoretical amount of the polymer on the assumption that the raw material is fully consumed by polycondensation.

(3) Additive

The compound MXn (where M denotes an alkali metal or an alkaline earth metal, X denotes at least one element selected from bromine, iodine and chlorine, and n=1 or 2) according to the embodiment of the invention may be, for example, lithium iodide, lithium bromide, lithium chloride, sodium iodide, sodium bromide, sodium chloride, potassium iodide, potassium bromide, potassium chloride, magnesium iodide, magnesium bromide, magnesium chloride, calcium iodide, calcium bromide or calcium chloride. In order to improve the dispersibility of the copper halide and improve the effect of reducing the acid value and the hydrolysis resistance, MXn is preferably an iodide or a bromide, and especially preferable are potassium iodide and potassium bromide. X of MXn according to the embodiment of the invention is preferably iodine or bromine, and M of MXn according to the embodiment of the invention is preferably potassium.

The compound (RCOO)nM (where R denotes hydrogen or an alkyl group containing 1 to 30 carbon atoms, M denotes an alkali metal or an alkaline earth metal, and n=1 or 2) according to the embodiment of the invention may be, for example, a formate, an acetate, a propionate, a butyrate, a valerate, a caproate, an enanthate, a caprylate, a pelargonate, a caprate, an undecylate, a laurate, a tridecylate, a myristate, pentadecylate, a palmitate, a margarate, a stearate, a nonadecylate, an arachidate, a heneicosanoate, a behenate, a tricosanoate, a lignocerate, a cerotate, a montanate, a melissate, a palmitoleate, an oleate, a vaccenate, a linoleate, a linolenate, an eleostearate, an icosadienoate, an icosatrienoate, an icosatetraenoate, an arachidonate, a nervonate or an analog having any of partial structures thereof. In order to improve the dispersibility of the copper halide and improve the dispersibility of (RCOO)nM itself, saturated fatty acid salts are preferable as (RCOO)nM, and more preferable are stearates such as potassium stearate, lithium stearate and calcium stearate and acetates such as potassium acetate, lithium acetate and calcium acetate. R of (RCOO) nM according to the embodiment of the invention is preferably hydrogen or a linear saturated alkyl group containing 1 to 30 carbon atoms, and more preferable is a linear saturated alkyl group containing 1 to 17 carbon atoms.

According to the embodiment of the invention, in order to improve the dispersibility of the copper halide and effectively reduce the acid value, the mixing amount of at least one additive selected from the group consisting of the compounds expressed by MXn and the compounds expressed by (RCOO)nM is preferably not less than 0.01 mmol and is more preferably not less than 0.02 mmol per 100 g of the polyester resin. The mixing amount of the additive is, on the other hand, preferably not greater than 3 mmol, is more preferably not greater than 1.5 mmol and is furthermore preferably not greater than 0.5 mmol per 100 g of the polyester resin. The mixing amount of not less than 0.01 mmol tends to provide good dispersibility of the copper halide and improve the effect of reducing the acid value. The mixing amount of not greater than 3 mmol, on the other hand, tends to provide good dispersibility of MXn or (RCOO)nM itself.

(4) Mixing Ratio of Copper Halide and Additive

According to the embodiment of the invention, in order to improve the dispersibility of the copper halide and efficiently reduce the acid value, it is preferable to adjust the mixing ratio of the copper halide and the additive to a specified range. More specifically, the mixing ratio (P/Q) of at least one additive (P mol), which is selected from the group consisting of the compounds expressed by MXn (where M denotes an alkali metal or an alkaline earth metal, X denotes at least one element selected from bromine, iodine and chlorine, and n=1 or 2) and the compounds expressed by (RCOO)nM (where R denotes hydrogen or an alkyl group containing 1 to 30 carbon atoms, M denotes an alkali metal or an alkaline earth metal, and n=1 or 2), to the copper halide (Q mol) is preferably not lower than 0.1, is more preferably not lower than 0.5 and is furthermore preferably not lower than 1.00. The mixing ratio (P/Q) is, on the other hand, preferably not higher than 50, is more preferably not higher than 25 and is furthermore preferably not higher than 2.00. The mixing ratio P/Q of not lower than 0.1 ensures sufficient dispersion of the copper halide. The mixing ratio P/Q of not higher than 50, on the other hand, tends to provide good dispersibility of the additive itself.

(5) Method of Producing Polyester Resin

The method of producing the polyester resin that is used according to the embodiment of the invention and is obtained from the dicarboxylic acid or the dicarboxylic acid dialkyl ester and the diol as the main raw material has the following two stage processes: first stage process of (A) esterification or (B) transesterification; and subsequent second stage process of (C) polycondensation.

The first stage process of (A) esterification causes esterification of the dicarboxylic acid and the diol to proceed at a predetermined temperature until a predetermined amount of water is distilled away, so as to obtain a low polycondensate. The first stage process of (B) transesterification causes transesterification of the dicarboxylic acid dialkyl ester and the diol to proceed at a predetermined temperature until a predetermined amount of alcohol is distilled away, so as to obtain a low polycondensate.

The second stage process of (C) polycondensation heats the low polycondensate obtained by (A) esterification or (B) transesterification under reduced pressure and thereby causes the reaction for diol elimination to proceed, so as to obtain a high molecular-weight polyester resin.

In production of the polyester resin composition according to the embodiment of the invention, a compound of, for example, manganese, cobalt, zinc, titanium or calcium may be used as the catalyst for esterification, or no catalyst may be used for esterification. A compound of, for example, magnesium, manganese, calcium, cobalt, zinc, lithium or titanium may be used as the catalyst for transesterification. A compound of, for example, antimony, titanium, aluminum, tin or germanium may be used as the catalyst for polycondensation.

The antimony compound may be, for example, an antimony oxide, an antimony carboxylate or an antimony alkoxide. Concrete examples of the antimony oxide include antimony trioxide and antimony pentoxide. Concrete examples of the antimony carboxylate include antimony acetate, antimony oxalate and antimony potassium tartrate. Concrete examples of the antimony alkoxide include antimony tri-n-butoxide and antimony triethoxide.

The titanium compound may be, for example, a titanium complex, a titanium alkoxide such as tetraisopropyl titanate, tetra-n-butyl titanate or tetra-n-butyl titanate tetramer, a titanium oxide obtained by hydrolysis of any of these titanium alkoxides, or titanium acetylacetonate. The titanium complex using a polycarboxylic acid and/or a hydroxycarboxylic acid and/or a polyol as the chelating agent is especially preferable in terms of providing the thermal stability of the polymer and preventing deterioration of the color tone of the polymer. The chelating agent of the titanium compound may be, for example, lactic acid, citric acid, mannitol or tripentaerythritol. Titanium mannitol chelate complex obtained by the method described in JP 2010-100806A is especially preferable as the catalyst, in terms of suppressing production of foreign particles in the polymer.

The aluminum compound may be, for example, an aluminum carboxylate, an aluminum alkoxide, an aluminum chelate compound or a basic aluminum compound. Concrete examples of the aluminum compound include aluminum acetate, aluminum hydroxide, aluminum carbonate, aluminum ethoxide, aluminum isopropoxide, aluminum acetylacetonate and basic aluminum acetate.

Examples of the tin compound include monobutyltin oxide, dibutyltin oxide, methylphenyltin oxide, tetraethyltin oxide, hexaethylditin oxide, triethyltin hydroxide, monobutylhydroxytin oxide, monobutyltin trichloride and dibutyltin sulfide.

The germanium compound may be, for example, a germanium oxide or a germanium alkoxide. Concrete examples of the germanium oxide include germanium dioxide and germanium tetroxide. Concrete examples of the germanium alkoxide include germanium tetraethoxide and germanium tetrabutoxide.

Concrete examples of the magnesium compound include magnesium oxide, magnesium hydroxide, magnesium alkoxide, magnesium acetate and magnesium carbonate.

Concrete examples of the manganese compound include manganese chloride, manganese bromide, manganese sulfate, manganese carbonate, manganese acetylacetonate and manganese acetate.

Concrete examples of the calcium compound include calcium oxide, calcium hydroxide, calcium alkoxide, calcium acetate and calcium carbonate.

Concrete examples of the cobalt compound include cobalt chloride, cobalt nitrate, cobalt carbonate, cobalt acetylacetonate, cobalt naphthenate and cobalt acetate tetrahydrate.

Concrete examples of the zinc compound include zinc oxide, zinc alkoxide and zinc acetate.

Any of these metal compounds may be a hydrate.

A phosphorus compound may be added as a stabilizer in production of the polyester resin used according to the embodiment of the invention. Concrete examples of the phosphorus compound include phosphoric acid, trimethyl phosphate, triethyl phosphate, ethyl diethylphosphonoacetate, 3,9-bis(2,6-di-tert-butyl-4-methylphenoxy)-2,4,8,10-tetraoxa-3,9-diphosphas pirol[5,5]undecane, and tetrakis(2,4-di-tert-butyl-5-methylphenyl)[1,1-biphenyl]-4,4'-diylbisphospho nite. In terms of improving the color tone and the thermal stability, the preferable phosphorus compound is a trivalent phosphorus compound such as 3,9-bis(2,6-di-tert-butyl-4-methylphenoxy)-2,4,8,10-tetraoxa-3,9-diphosphas pirol[5,5]undecane (PEP36 manufactured by ADEKA CORPORATION) or tetrakis(2,4-di-tert-butyl-5-methylphenyl)[1,1-biphenyl]-4,4'-diylbisphospho nite (GSY-P 101 manufactured by OSAKI INDUSTRY CO., LTD).

According to the embodiment of the invention, solid phase polymerization may be performed when the polyester resin used has a high molecular weight. The solid phase polymerization does not specifically limit the equipment or the method but requires heating in an inert gas atmosphere or under reduced pressure. The inert gas may be any gas that is inactive to polyester and may be, for example, nitrogen, argon, helium or carbon dioxide. From the economic standpoint, it is preferable to use nitrogen. As the reduced pressure condition, the lower pressure is advantageous to shorten the time period required for the solid phase polymerization, but the pressure is preferably kept at or above 110 Pa.

The polyester resin used according to the embodiment of the invention may be produced by batch polymerization, semi-continuous polymerization or continuous polymerization.

A dye used for the resin or the like may be added as a color modifier as appropriate. More specifically, a blue color modifier such as Solvent Blue 104 or Solvent Blue 45 or a violet color modifier such as Solvent Violet 36 in the Color Index Generic Name is preferable, since these color modifiers have good heat resistance at high temperature and excellent color development. Any of these color modifiers may be used alone, or two or more color modifiers may be used in combination.

An antioxidant, an ultraviolet absorber, a flame retardant, a fluorescent whitening agent, a matting agent, a plasticizer, an antifoaming agent or another additive may be additionally mixed as appropriate.

(6) Method of Producing Polyester Resin Composition

The available method of producing the polyester resin composition according to the embodiment of the invention may be, for example, (i) a method of adding the copper halide and the additive in the course of producing the polyester resin; (ii) a method of melt kneading the copper halide and the additive with the polyester resin; or (iii) a method of mixing the copper halide and the additive with the polyester resin in a solvent. The effect of reducing the acid value of the polyester resin by the copper compound is accelerated by melt mixing the copper halide and the additive with the polyester resin in the molten state, so that the methods (i) and (ii) are preferable. Mixing the copper halide and the additive with the polyester resin at the higher temperature provides the higher effect of reducing the acid value of the polyester resin, so that the mixing temperature is preferably 200° C. or higher. The temperature at which the copper halide and the additive are mixed with the polyester resin is more preferably 240° C. or higher and is furthermore preferably 270° C. or higher. When the copper halide and the additive are added in the course of producing the polyester resin, the copper halide and the additive may be added in any stage of the process (A) or (B) and the subsequent process (C) in the method of producing the polyester resin described above. In order to efficiently reduce the acid value and obtain the polyester resin composition having the high hydrolysis resistance, it is preferable to add the copper halide and the additive at the start of polycondensation or during polycondensation in the process (C). In order to improve the dispersibility of the copper halide, it is especially preferable to add the copper halide and the additive at the start of polycondensation in the process (C). The formulation employed to add each of the polycondensation catalyst, the copper halide and another additive may be one formulation for addition selected from a single body, a solution and a suspension. When each of the polycondensation catalyst, the copper halide and another additive is added in the form of a diol solution or a diol suspension, the ratio of the weight of the polycondensation catalyst, the copper halide or another additive to the weight of diol is preferably 1/100 to 20/100. In order to improve the dispersibility of the copper halide in the polyester resin, at least one additive selected from the group consisting of the compounds expressed by the formula (i) given below and the compounds expressed by the formula (ii) given below may be mixed in advance with the copper halide, before being added:

MX$n$                                             (i)

(where M denotes an alkali metal or an alkaline earth metal, X denotes at least one element selected from bromine, iodine and chlorine, and n=1 or 2); and

(RCOO)$n$M                                   (ii)

(where R denotes hydrogen or an alkyl group containing 1 to 30 carbon atoms, M denotes an alkali metal or an alkaline earth metal, and n=1 or 2).

(6) Polyester Resin Composition

The polyester resin composition according to the embodiment of the invention has excellent hydrolysis resistance. The hydrolysis resistance is evaluated by calculating the retention rate of the number average molecular weight that is division of the number-average molecular weight of the polyester resin after treatment by the number-average molecular weight of the polyester resin before treatment when the polyester resin composition is treated under conditions of 121° C. and 100% RH for 24 hours. The number-average molecular weight may be measured by gel permeation chromatography. In order to provide the excellent hydrolysis resistance, the retention rate of the number-average molecular weight is preferably not lower than 75%. The retention rate of the number-average molecular weight is more preferably not lower than 80%, is furthermore preferably not lower than 85% and is especially preferably not lower than 90%.

The color tone of the pellets of the polyester resin composition according to the embodiment of the invention may be evaluated by the hunter values (L value and b value) using a color difference meter. The L value of the pellets obtained by ejecting the polyester resin composition in the molten state into strands, quenching the strands in water to solidify the strands and subsequently cutting the strands into pellets is preferably not less than 50. The L value of the pellets is more preferably not less than 55 and is furthermore preferably not less than 60. The b value of the pellets is preferably closer to zero. The b value of the pellets is more preferably not less than 0 and not greater than 13, is furthermore preferably not less than 0 and not greater than 11.5 and is most preferably not less than 0 and not greater than 10. The L value of not less than 50 and the b value of not greater than 13 provide the pellets of the polyester resin composition having the excellent color tone. The pellets vacuum-dried at temperature that does not crystallize the polyester resin are used for measurement of the color tone.

The dispersibility of the copper halide in the polyester resin composition according to the embodiment of the invention may be evaluated by the solution haze using a haze meter. The haze of the solution obtained by dissolving the polyester resin composition in ortho-cresol is preferably not higher than 3.0. The haze is more preferably not higher than 2.0 and is furthermore preferably not higher than 1.0. The haze of not higher than 3.0 provides the polyester resin composition having the improved dispersibility of the copper halide.

The polyester resin composition obtained according to the embodiment of the invention may be molded and processed by a known processing method and may be processed to a wide variety of products such as fibers, films, bottles and injection molded products.

For example, a general melt spinning—drawing process may be employed to process the polyester resin composition into fiber. More specifically, the polyester resin composition is heated to the melting point of the polyester resin or the higher temperature to be melted, is subsequently ejected from fine holes, and is cooled down and solidified with the cooling air. After addition of an oil solution, undrawn yarn is hauled off by a haul-off roller and is wound up by a winding machine located downstream of the haul-off roller.

The wound-up undrawn yarn is drawn with a pair of or multiple pairs of heated rollers and is eventually subjected to heat treatment under tension or under relaxation. This provides a fiber having physical properties including mechanical properties suitable for its application. The undrawn yarn hauled off in the melt spinning process described above may be continuously subjected to the drawing process without being wound up. Such continuous drawing may be employed in terms of the industrial standpoint, such as the productivity. In this drawing—heat treatment process, the drawing rate, the drawing temperature and the heat treatment conditions may be selected appropriately according to, for example, the target fineness, the target strength, the target degree of elongation and the target degree of shrinkage of the fiber.

A method of processing the polyester resin composition according to the embodiment of the invention into film is described concretely. The following describes an example of quenching the polyester resin composition to produce a low-density unstretched film and then stretching the film by successive biaxial stretching, but this example is not restrictive.

The polyester resin composition is heated and dried in vacuum at 180° C. for three or more hours, and is subsequently supplied to a single-screw extruder or a twin-screw extruder heated at 270 to 320° C. under nitrogen stream or under vacuum with suppressing reduction of the intrinsic viscosity. The polymer is plasticized and melt extruded from a slit-like die, and is then cooled down and solidified on a casting roll to provide an unstretched film. In this process, it is preferable to use any of various filters, for example, a filter formed from sintered metal, porous ceramic, sand or metal wire, for removal of foreign substances and degraded polymers. A gear pump may additionally be provided to improve the fixed volume supply performance as appropriate. Subsequently the sheet-like film formed as described above is biaxially stretched. The film is biaxially stretched in a longitudinal direction and in a width direction and is then subjected to heat treatment. The available stretching method may be, for example, (i) successive biaxial stretching method of stretching first in the longitudinal direction and subsequently stretching in the width direction; (ii) simultaneous biaxial stretching method of simultaneously stretching in the longitudinal direction and in the width direction, for example, using a simultaneous biaxial tenter; or (iii) method of combining the successive biaxial stretching method and the simultaneous biaxial stretching method. With a view to controlling the thermal expansion coefficient and the thermal shrinkage rate to desired ranges, the heat treatment after the stretching process is desirably non-excessive, effective heat treatment without causing relaxation of the molecular chain orientation.

In the case of processing the polyester resin composition according to the embodiment of the invention into a wide variety of products, various additives may be added to such an extent that does not damage the advantageous effects. For example, one or more of the following additives may be added as the various additives: coloring agents including pigments and dies, lubricants, antistatic agents, flame retardants, ultraviolet absorbers, antimicrobial agents, nucleating agents, plasticizers and mold release agents.

The polyester resin composition according to the embodiment of the invention may be used for a variety of products such as fibers, films, bottles and injection molded products by taking advantage of the excellent hydrolysis resistance and the good color tone of the polyester resin composition. These products are effectively used as agricultural materials, horticultural materials, fishery materials, civil engineering and building materials, stationery, medical products, automobile parts, electric and electronic parts and other applications.

EXAMPLES

The following describes the embodiment of the invention more in detail with reference to examples. The following raw materials were used in the examples:
dimethyl terephthalate manufactured by SK Chemicals; and
ethylene glycol manufactured by NIPPON SHOKUBAI CO., LTD.

The physical properties of the examples were measured by the methods described below.

(1) Intrinsic Viscosity ([η]), Unit: dl/g) of Polyester Resin

Solutions of different concentrations, 0.5 g/dL, 0.2 g/dL and 0.1 g/dL were prepared by dissolving the polyester resin composition in an o-chlorophenol solvent. The relative viscosity (ηr) of each prepared solution having concentration C was measured by an Ubbelohde viscometer, and (ηr−1)/C was plotted against C. The intrinsic viscosity was determined by extrapolation of the obtained results to the concentration of zero.

(2) Acid Value (Unit: eq/t) of Polyester Resin

The polyester resin composition was dissolved in an o-cresol solvent. The acid value was determined by titrating this solution with a 0.02 N NaOH aqueous solution at 25° C. using an automatic titration apparatus (COM-550 manufactured by Hiranuma Sangyo Co., Ltd.)

(3) Amount of Terminal Benzoic Acid Group (Unit: Eq/t) of Polyester Resin

The polyester resin composition was dissolved in a deuterated hexafluoroisopropanol solvent, and $^1$H-NMR of this solution was measured using a 400 MHz nuclear magnetic resonator (NMR) manufactured by JEOL Ltd.

The amount of terminal benzoic acid group was calculated from a ratio of peak area of the terminal benzoic acid group to peak area of the benzene ring included in the polymer chain according to the following equation:

Peak of terminal benzoic acid group: δ8.36 (d, J=8.4 Hz, 2H), 7.63 (t, J=7.6 Hz, 1H), 7.47 (dd, J=8.4 Hz, 7.6 Hz, 2H)

Peak of benzene ring included in polymer chain: δ8.12 (br)

Amount of terminal benzoic acid group (eq/t)=peak area at 7.47 ppm/peak area at 8.10 ppm×2× 1000000/192

(4) Hydrolysis Resistance of Polyester Resin

The polyester resin composition was pressed at 280° C. to a plate of 1 mm in thickness. The plate was maintained at 121° C. under the high humidity condition of 100% RH for 24 hours. The number-average molecular weight of the polyester resin was measured with regard to the plate before and after the treatment under the high-humidity condition. The retention rate (%) of the number-average molecular weight after the treatment under the high-humidity condition to the number-average molecular weight before the treatment under the high-humidity condition was calculated.

Gel permeation chromatography was used for measurement of the number average molecular weight. A solution having the sample concentration of 1 mg/mL was prepared by dissolving the polyester resin composition in hexafluoroisopropanol (with addition of 0.005 N sodium trifluoroacetate) and was used for measurement. The measurement conditions are given below:
pump: Waters 515 (manufactured by Waters)
detector: differential refractometer Waters 410 (manufactured by Waters9
column: Shodex HFIP-806M (two)+HFIP-LG
solvent: hexafluoroisopropanol (with addition of 0.005 N sodium trifluoroacetate)
flow rate: 1.0 ml/min
injection amount of sample: 0.1 ml
temperature: 30° C.
calibration of molecular weight: poly(methyl methacrylate)

(5) Evaluation of Transparency of Pellets of Polyester Resin Composition

The ejected polyester resin composition was visually evaluated as: circle for high transparency and colorless, triangle for faintly colored but high transparency and cross mark for deeply colored and low transparency.

(6) Color Tone of Pellets of Polyester Resin Composition

The hunter values (L value and b value) were determined based on the color system described in JIS Z8730 using a color difference meter (SM color computer model SM-T45 manufactured by Suga Test Instruments Co., Ltd.)

(7) Dispersibility of Copper Halide in Polyester Resin Composition

A solution obtained by dissolving 2 g of the ejected polyester resin composition in 20 ml of a phenol/1,1,2,2-tetrachloroethane 3/2 (volume ratio) mixed solvent was placed in a cell having the optical length of 20 mm and was analyzed by integrating-sphere photoelectric photometry using a haze meter (HZ-1 manufactured by Suga Test Instruments Co., Ltd.)

(8) Comprehensive Evaluation of Color Tone of Pellets of Polyester Resin Composition and Dispersibility of Copper Halide The color tone (hunter values) and the dispersibility (haze value) were classified by the following criteria. The larger L value is more preferable. The b value closer to zero is more preferable. The haze value closer to 0% is more preferable.
AA: satisfying L≥60, b≤10, haze≤2%
A: satisfying L≥50, b≤13, haze≤3% other than AA
B: satisfying L≥40, b≤15, haze≤4% other than AA and A
C: unsatisfying any of AA, A and B (9) Relative Viscosity of Polyamide Resin (Comparative Examples 8 and 9)

The relative viscosity was measured at the concentration of 0.01 g/ml in 98% sulfuric acid at 25° C. using an Ostwald viscometer.

(10) Amount of Terminal Carboxyl Group of Polyamide Resin (Comparative Examples 8 and 9)

A solution obtained by adding 20 ml of benzyl alcohol to about 0.5 g of precisely weighed polyamide resin and dissolving the polyamide resin at 190° C. was titrated using a 0.02 N ethanol solution of potassium hydroxide.

Example 1

Magnesium acetate was added to 100 parts by weight of dimethyl terephthalate and 60 parts by weight of ethylene glycol at an amount of 0.05 mmol in terms of magnesium atom per 100 g of the resulting polymer. The mixture was melted at 150° C. in a nitrogen atmosphere and was subsequently heated to 240° C. over 4 hours with stirring. This caused transesterification with distillation out of methanol to obtain bis(hydroxyethyl) terephthalate.

The obtained bis(hydroxyethyl) terephthalate was placed in a test tube and was kept in the molten state at 250° C. Antimony trioxide of 0.2 mmol per 100 g of the resulting polymer, trimethyl phosphate of 0.1 mmol per 100 g of the resulting polymer, copper (I) iodide of 0.06 mmol per 100 g of the resulting polymer and potassium iodide of 0.06 mmol per 100 g of the resulting polymer were weighed. Antimony trioxide and trimethyl phosphate were respectively dissolved to give 6.5% by weight of ethylene glycol solutions, were mixed and were added to the test tube. Copper (I) iodide, potassium iodide and ethylene glycol were mixed at a weight ratio of 3.50/3.05/100 and were added to the test tube.

After elapse of 5 minutes since addition of the respective compounds, the reaction vessel was gradually heated from 250° C. to 290° C. over 60 minutes, while the pressure was reduced from ordinary pressure to 130 Pa over 60 minutes. Polycondensation continued at 290° C. and 130 Pa and was terminated when the torque applied to the stirring rod in the test tube reached a value corresponding to a target intrinsic viscosity. After termination of the polycondensation, the molten material was ejected in strands from ejection holes of 9 mm in diameter into water of 20° C., was quenched and was subsequently cut at intervals of 4 mm to give pellets. The obtained pellets of the polyester resin composition were vacuum dried at 80° C. for 24 hours. The results are shown in Table 1.

Examples 2 to 16 and Comparative Examples 1 to 7

These examples and comparative examples obtained polyester resin compositions by the similar method to that of Example 1, except changing the type and the mixing amount of the copper halide and/or the type and the mixing amount of the additive.

Examples 17 and 18

These examples performed polycondensation by the similar method to that of Example 1 except changing the mixing amount of copper (I) iodide and the mixing amount of potassium iodide, but did not reach the target torque in the respective time periods indicated.

TABLE 1

| | Copper compound | | Additive | | | Poly-condensation time hr:min | Intrinisic viscosity dl/g | Acid value eq/t | Amount of terminal benzole acid group eq/t | Hydrolysis resistance Retention rate of number-average molecular weight % | Color tone of pallets & Dispersibility of copper halide | | | | Comprehensive evaluation |
|---|---|---|---|---|---|---|---|---|---|---|---|---|---|---|---|
| | Type | Amount (Q) per 100 g polymer mmol | Type | Amount (P) per 100 g polymer mmol | P/Q | | | | | | Transparancy | L value | b value | Haze % | |
| EX 1 | CuI | 0.06 | KI | 0.06 | 1 | 2:25 | 0.69 | 0.5 | 20 | 92.7 | ○ | 70.1 | 7.2 | 1.8 | AA |
| EX 2 | CuI | 0.06 | KI | 0.12 | 2 | 2:20 | 0.69 | 0.4 | 21 | 92.8 | ○ | 70.8 | 9.5 | 1.5 | AA |
| EX 3 | CuI | 0.02 | KI | 0.20 | 10 | 2:10 | 0.69 | 0.4 | 21 | 92.5 | ○ | 69.2 | 9.8 | 1.2 | AA |
| EX 4 | CuI | 0.06 | KI | 0.003 | 0.05 | 2:25 | 0.69 | 14.8 | 5 | 80.3 | ○ | 65.4 | 5.1 | 2.5 | A |
| EX 5 | CuI | 0.001 | KI | 0.06 | 60 | 2:10 | 0.69 | 10.2 | 3 | 77.8 | ○ | 68.8 | 7.4 | 1.0 | AA |
| EX 6 | CuI | 0.12 | KI | 0.12 | 1 | 3:40 | 0.69 | 0.4 | 21 | 92.0 | ○ | 68.3 | 9.8 | 2.2 | A |
| EX 7 | CuI | 0.06 | KBr | 0.06 | 1 | 2:25 | 0.69 | 0.8 | 19 | 92.2 | ○ | 69.2 | 7.4 | 1.7 | AA |
| EX 8 | CuI | 0.06 | LiI | 0.06 | 1 | 2:20 | 0.69 | 6.7 | 13 | 83.3 | ○ | 68.8 | 7.5 | 1.7 | AA |
| EX 9 | CuBr | 0.06 | KI | 0.06 | 1 | 2:25 | 0.69 | 0.9 | 20 | 92.0 | ○ | 68.1 | 7.3 | 1.6 | AA |
| EX 10 | CuBr2 | 0.06 | KI | 0.06 | 1 | 2:25 | 0.69 | 1.0 | 19 | 91.9 | ○ | 69.5 | 7.4 | 1.6 | AA |

TABLE 2

| | Copper compound | | Additive | | | Poly-condensation time hr:min | Intrinisic viscosity dl/g | Acid value eq/t | Amount of terminal benzole acid group eq/t | Hydrolysis resistance Retention rate of number-average molecular weight % | Color tone of pallets & Dispersibility of copper halide | | | | Comprehensive evaluation |
|---|---|---|---|---|---|---|---|---|---|---|---|---|---|---|---|
| | Type | Amount (Q) per 100 g polymer mmol | Type | Amount (P) per 100 g polymer mmol | P/Q | | | | | | Transparancy | L value | b value | Haze % | |
| EX 11 | CuCl | 0.06 | KI | 0.12 | 2 | 2:20 | 0.69 | 1.1 | 19 | 91.7 | ○ | 69.2 | 9.8 | 1.5 | AA |
| EX 12 | CuI | 0.06 | potassium stearate | 0.06 | 1 | 2:20 | 0.69 | 1.3 | 18 | 91.4 | ○ | 60.9 | 5.2 | 1.8 | AA |

TABLE 2-continued

| | Copper compound | | Additive | | | | | | Hydrolysis resistance Retention | Color tone of pallets & Dispersibility of copper halide | | | | |
|---|---|---|---|---|---|---|---|---|---|---|---|---|---|---|
| | Type — | Amount (Q) per 100 g polymer mmol | Type — | Amount (P) per 100 g polymer mmol | P/Q — | Poly-conden-sation time hr:min | Intrinisic viscosity dl/g | Acid value eq/t | Amount of terminal benzole acid group eq/t | rate of number-average molecular weight % | Trans-parancy | L value | b value | Haze % | Compre-hensive evalu-ation |
| EX 13 | CuI | 0.02 | potassium stearate | 0.20 | 10 | 2:25 | 0.69 | 0.6 | 19 | 92.2 | ○ | 58.5 | 5.3 | 1.2 | A |
| EX 14 | CuI | 0.06 | calcium stearate | 0.06 | 1 | 2:25 | 0.69 | 1.6 | 18 | 91.0 | ○ | 61.2 | 5.2 | 2.1 | A |
| EX 15 | CuI | 0.06 | potassium acetate | 0.06 | 1 | 2:25 | 0.69 | 1.5 | 18 | 91.2 | ○ | 60.2 | 5.0 | 2.5 | A |
| EX 16 | CuI | 0.02 | KI | 4.00 | 200 | 2:25 | 0.69 | 0.5 | 20 | 92.5 | ○ | 68.0 | 12.3 | 0.5 | A |
| EX 17 | CuI | 0.60 | KI | 0.60 | 1 | 3:00 | 0.55 | 0.5 | 26 | 92.4 | ○ | 68.0 | 10.0 | 2.0 | A |
| EX 18 | CuI | 1.20 | KI | 1.20 | 1 | 3:40 | 0.48 | 0.3 | 35 | 94.5 | Δ (pale brown) | 68.2 | 10.9 | 2.2 | A |

TABLE 3

| | Copper compound | | Additive | | | | | | Amount of terminal benzole acid group eq/t | Hydrolysis resistance Retention rate of number-average molecular weight % | Color tone of pallets & Dispersibility of copper halide | | | | |
|---|---|---|---|---|---|---|---|---|---|---|---|---|---|---|---|
| | Type — | Amount (Q) per 100 g polymer mmol | Type — | Amount (P) per 100 g polymer mmol | P/Q — | Poly-conden-sation time hr:min | Intrini-sic viscos-ity dl/g | Acid value eq/t | | | Trans-parancy | L value | b value | Haze % | Com-pre-hensive evalu-ation |
| COMP EX 1 | not used | — | not used | — | — | 2:25 | 0.69 | 19.5 | 0 | 65.0 | ○ | 69.1 | 3.5 | 0.6 | AA |
| COMP EX 2 | CuI | 0.06 | not used | — | — | 2:25 | 0.69 | 18.5 | 1 | 75.8 | ○ | 62.7 | 3.8 | 3.1 | B |
| COMP EX 3 | CuI | 0.12 | not used | — | — | 2:25 | 0.69 | 16.6 | 3 | 77.6 | ○ | 60.7 | 4.2 | 4.3 | C |
| COMP EX 4 | not used | — | KI | 0.06 | — | 2:45 | 0.69 | 19.2 | 0 | 10.9 | ○ | 68.5 | 7.3 | 0.5 | AA |
| COMP EX 5 | not used | — | potassium stearate | 0.06 | — | 2:20 | 0.69 | 20.0 | 0 | 66.3 | ○ | 67.9 | 3.5 | 0.6 | AA |
| COMP EX 6 | copper (I) acetate | 0.06 | KI | 0.12 | 2 | 2:35 | 0.69 | 1.5 | 18 | 90.9 | X (brown) | 33.8 | 18.9 | 1.5 | C |
| COMP EX 7 | copper (II) acetate | 0.06 | KI | 0.12 | 2 | 2:20 | 0.69 | 1.5 | 19 | 90.6 | X (green) | 34.3 | 18.5 | 1.5 | C |

According to the results of Tables 1 to 3, Examples 1 to 18 have better hydrolysis resistance and better-balanced color tone, compared with Comparative Examples 1 to 7.

Comparative Example 8

A test tube with 20 g of a 50% by weight of aqueous solution of equimolar salts of hexamethylene diamine and adipic acid placed therein was sealed in an autoclave and was subjected to nitrogen substitution. The jacket temperature was set to 310° C., and heating was started. After reaching 1.7 MPa, the internal pressure was kept at 1.7 MPa for 3 hours. The jacket temperature was then set to 320° C., and the internal pressure was reduced to ordinary pressure over 1 hour. The heating was terminated when the internal temperature reached 285° C. After the inside of the autoclave was cooled down to room temperature, the test tube was taken out from the autoclave. This provided a polyamide resin. The relative viscosity of this polyamide resin was 2.7, and the amount of terminal carboxyl group was 78 mol/t.

Comparative Example 9

This comparative example obtained a polyamide resin composition under the same conditions as those of Example 7 except addition of an aqueous solution prepared by dissolving 0.00518 mmol of copper iodide and 0.0518 mmol of potassium iodide in 2 g of water to 20 g of a 50% by weight of aqueous solution of equimolar salts of hexamethylene diamine and adipic acid. The relative viscosity of this polyamide resin composition was 2.8, and the amount of terminal carboxyl group was 77 mol/t.

According to the comparison between Comparative Example 8 and Comparative Example 9, there were no significant differences in relative viscosity and the amount of terminal carboxyl group. Accordingly addition of the copper halide to the polyamide resin did not provide the effect of reducing the acid value.

The invention claimed is:
1. A polyester resin composition, comprising:
    a polyester resin that is prepared from a dicarboxylic acid or a dicarboxylic acid dialkyl ester and a diol as main raw material and mixed with:

a copper halide; and
a compound expressed by a formula (i):

$$MX_n \qquad (i)$$

(where M denotes an alkali metal or an alkaline earth metal, X denotes at least one element selected from bromine, iodine and chlorine, and n=1 or 2),
wherein a ratio (P/Q) of a mixing amount (P mol) of the compound expressed by the formula (i) to a mixing amount (Q mol) of the copper halide is 0.1 to 50.

2. The polyester resin composition according to claim 1, wherein 0.01 to 1 mmol of the copper halide is mixed relative to 100 g of the polyester resin.

3. The polyester resin composition according to claim 1, wherein 0.01 to 3 mmol of the compound expressed by the formula (i) is mixed relative to 100 g of the polyester resin.

4. The polyester resin composition according to claim 1, wherein a ratio (P/Q) of a mixing amount (P mol) of the compound expressed by the formula (i) to a mixing amount (Q mol) of the copper halide is greater than or equal to 0.5 and less than or equal to 2.00.

5. The polyester resin composition according to claim 1, wherein copper of the copper halide is either monovalent or divalent.

6. The polyester resin composition according to claim 1, wherein a halogen atom of the copper halide includes at least one element selected from the group consisting of iodine, bromine and chlorine.

7. The polyester resin composition according to claim 1, wherein X of the compound expressed by the formula (i) is either iodine or bromine.

8. The polyester resin composition according to claim 1, wherein M of the compound expressed by the formula (i) is potassium.

9. The polyester resin composition according to claim 1, wherein the dicarboxylic acid or the dicarboxylic acid dialkyl ester is an aromatic dicarboxylic acid or a dialkyl aromatic dicarboxylate.

10. The polyester resin composition according to claim 1, wherein the diol is ethylene glycol.

11. The polyester resin composition according to claim 1, wherein the polyester resin has an intrinsic viscosity of 0.50 to 1.8.

12. The polyester resin composition according to claim 1, wherein the polyester resin has an acid value of not higher than 13 eq/t.

13. The polyester resin composition according to claim 1, wherein the polyester resin has an amount of terminal benzoic acid group of 3 to 30 eq/t.

14. The polyester resin composition according to claim 1, the polyester resin composition having a solution haze of not higher than 3%.

15. A method of producing a polyester resin composition, comprising:
adding a copper halide and a compound expressed by a formula (i) to a polyester resin prepared from a dicarboxylic acid or a dicarboxylic acid dialkyl ester and a diol as main raw material:

$$MX_n \qquad (i)$$

(where M denotes an alkali metal or an alkaline earth metal, X denotes at least one element selected from bromine, iodine and chlorine, and n=1 or 2).

16. The method of producing the polyester resin composition according to claim 15,
wherein the adding comprises adding the copper halide and the compound to the polyester resin at start of polycondensation or during polycondensation.

* * * * *